3,286,181
APPARATUS FOR MAINTAINING A RELIABLE ELECTRICAL CONNECTION WITH COMPONENT LEADS
John Dudash, Jr., Reading, John R. Gable, Jr., State College, and John M. Keating, Muhlenberg Park, Pa., assignors to Western Electric Company, Incorporated, New York, N.Y., a corporation of New York
Filed Nov. 13, 1962, Ser. No. 237,066
1 Claim. (Cl. 324—158)

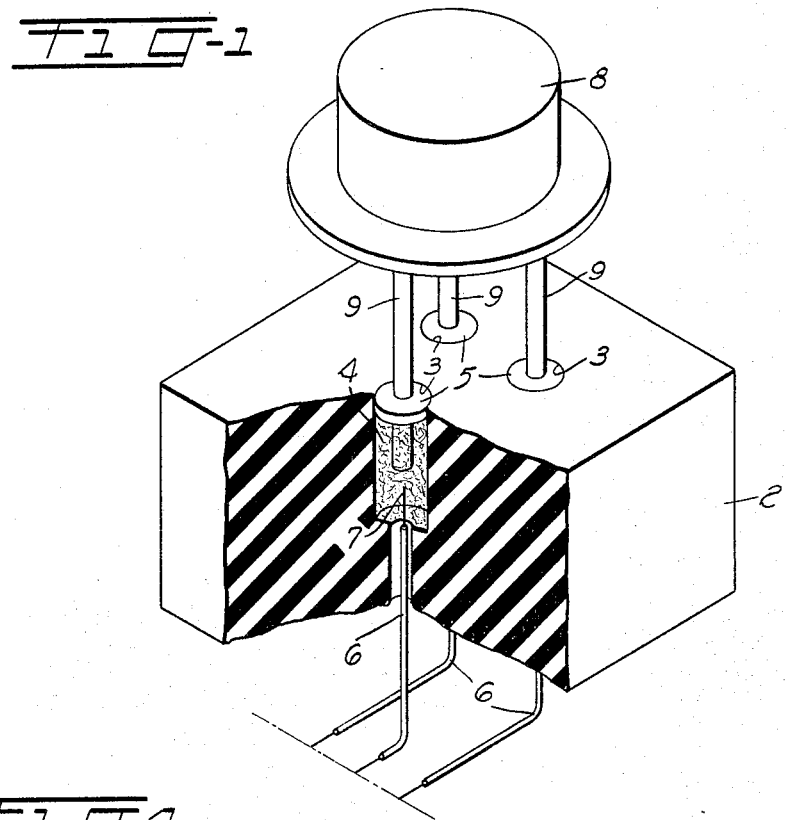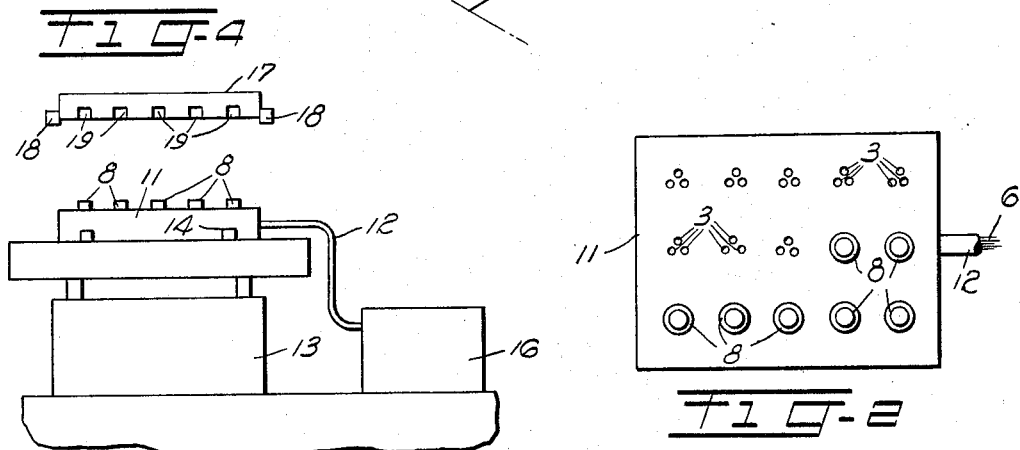

This invention relates to electrical test fixtures and, particularly but not necessarily exclusively, to test fixtures for use in the environmental testing of electrical devices, for example transistors and/or diodes.

In the past, the spring type connections which were in widespread use in the environmental testing of electrical devices under extreme conditions, as for example, severe vibrational stresses, caused substantial difficulty in that such connections would consistently tend to separate in time under the fatiguing influences of the test conditions. This separation necessitated a complete recycling of the testing procedures, which resulted in the loss of valuable time. Further, such connections very often resulted in undesirable bending or scoring of the connector elements of the devices due to the rigors of the test conditions.

It is, accordingly, an object of this invention to provide a test fixture particularly adaptable to the maintenance of a reliable electrical connection with an electrical device under environmental test conditions.

Another object of this invention is to maintain such connection with an absolute minimum of damage to the connector elements of the device under test.

A further object of this invention is the provision of a test fixture which embodies therein significant economies in the design, fabrication, maintenance, and utilization thereof in the manner set forth in detail hereinbelow.

A still further object of our invention is the provision of a fixture which, by virtue of the unique structural design thereof, is not limited to utilization under environmental test conditions but is, rather, adaptable to permanent incorporation in a wide variety of circuits. In fact, the test fixture which is the subject of this invention may be used under acual operating conditions.

In a preferred embodiment herein-disclosed, the invention comprises a block of non-conducting material which includes a plurality of holes formed therein. A corresponding plurality of complementary shaped slugs, formed of a non-liquid, readily pierceable electrically conductive material, are positioned in each of the said holes. An electrical conductor is connected to the lower portion of each slug and extends therefrom for connection to other elements of a circuit. In operation, the connector elements of electrical devices to be connected in circuits through the use of the instant invention are pressed into the conductive slugs whereby a reliable electrical connection is established between the devices and the circuit.

The details and the above and other objects and advantages of our invention are believed made clear by reference to the accompanying drawings wherein:

FIG. 1 is an isometric view, partially in section, of a preferred embodiment of our invention depicted in conjunction with a transistor partially mounted therein;

FIG. 2 is a top plan view of another preferred embodiment of our invention depicted in conjunction with a plurality of transistors mounted therein;

FIG. 3 is a side plan view of the embodiment of FIG. 2 depicted in conjunction with a schematic depiction of a shaker table and transistor test set, and FIG. 4 is a side plan view, in section, of a cover adapted for use in conjunction with the embodiment of FIG. 3.

Turning now to FIG. 1 of such drawings, the therein-depicted embodiment of the invention will be seen to comprise a test fixture which includes a block 2 of electrically non-conductive material, as for example plastic or a similar material, with a plurality of holes 3—preferably but not necessarily including stepped bores in the manner shown—formed therein. A plurality of complementary shaped slugs 4 of a non-liquid, readily pierceable electrically conductive material are positioned in the upper portions of each of the holes 3. The slugs 4 are maintained in the holes 3 by the frictional force they exert against the walls thereof, and by bored, solder collars 5 mounted at the top of each of the holes. The readily pierceable electrically conductive material which forms the slugs 4 is capable of establishing and maintaining a reliable electrical contact with an electrically conductive element pressed thereinto. In this respect, it is to be noted that metal textiles in the nature of a continuous knitted wire braid of gold-plated Phosphor bronze or copper, as for example "Fuzz Button" manufactured by the Technical Wire Products Company, of Cranford, New Jersey, have proven particularly satisfactory in this regard.

Electrical conductors 6 are connected to the lower portions of each of the slugs at 7 and extend therefrom through the lower portions of the stepped bores 3 without the block 2 to thus enable the convenient connection of electrically conductive elements pressed into slugs 4 into a circuit. As an aid to a complete understanding of the structure and function of the fixture, a transistor 8 is depicted above the fixture with the leads 9 thereof extending through the holes in the solder collars 5 and partially pressed into the respective slugs 4 of the electrically conductive material. In operation, such leads would, of course, be pressed substantially all the way into the respective slugs whereupon a reliable electrical connection, capable of withstanding vibrational stresses without damage to the leads, would be established between the transistor and the test fixture. The distinct superiority of the established connection over those heretofore employed for such purpose is a direct result of the large plurality of physical and electrically conductive contacts which are established between the individual fibers of the metal textile slug and the transistor lead upon the insertion of the latter into the former. Thus, it may be readily appreciated that although some portion of such physical contacts may be momentarily broken at any given instant during the course of a vibrational fatigue test upon an operating transistor, more than a sufficient number of such contacts will, at the same time, remain intact or be re-established to insure the maintenance of a satisfactory electrical contact between the transistor and the slug at all imes during the test. It may be further appreciated that the insertion and removal of the leads of electrical devices into and from the fixture of our invention in the connection of such devices to an associated circuit are, by virtue of our invention, greatly simplified. Furthermore, lead damage which has heretofore resulted from bending, or scoring of the leads in the connection thereof to a circuit for testing in a vibrational environment, is substantially eliminated due to the extreme resiliency of the metal fibers.

Turning now to FIG. 2, the preferred embodiment depicted therein will be seen to comprise a similar block of non-conducting material 11 in which are formed, in the manner of the embodiment of FIG. 1, a plurality of bores 3 thereby enabling the connection and environmental testing of a plurality of transistors 8 at the same time. A flexible, multi-conductor cable 12 is provided, wherein each of electrical conductors 6 which extend from the holes 3 in the manner of FIG. 1 may be conveniently grouped together for unitary connection to an associated test set.

FIG. 3 will be seen to depict the fixture of FIG. 2 operationally positioned atop a shaker table 13 and maintained thereon by fastening means 14. Test set 16 is depicted as connected to the fixture-mounted transistors through the medium of the multi-conductor cable 12 whereby various electrical tests, as for example reverse current and forward voltage tests, may be run on the transistors while they are vibrated along with the fixture at predetermined amplitude levels for predetermined times by the shaker table.

FIG. 4 depicts one embodiment of a fixture cover 17 for use in conjunction with the embodiment of FIG. 3 in instances where the severity of the conditions requires additional transistor holding means. Fastening means 18 and hollow portions 19—shaped to enable the encapsulated portions of transistor 8 to fit snugly therein—are included in the cover whereby same may be conveniently attached to the fixture 11 and maintain the transistors securely mounted thereon under the most severe of test conditions. For example, military transistor specifications might require the transistors to be subjected to vibrational stresses of 20 G's for periods of 72 hours during the course of the performance of various electrical tests thereon.

Various modifications of our invention will become apparent to those skilled in this art after reading this disclosure. For example, it will become apparent that the disclosed embodiments of the fixture are not limited solely to use in conjunction with environmental testing, but rather, might find ready utilization in more permanent types of circuit applications as a result of the economies of fabrication, utilization and maintenance inherent in the design thereof. It will further become apparent that the fixtures are not limited to utilization in the testing of three-lead semiconductor devices, but rather, are readily adaptable to utilization in the testing of two, four, or more lead electrical devices through the simple expedient of changing the number and configuration of the holes 3. It is, therefore, intended that the matter contained in the foregoing description and annexed drawings be interpreted as illustrative only, and not in a limiting sense, when consideration is given to the scope of the appended claim.

What is claimed is:

Apparatus for the environmental testing of electrical devices having a body portion and a plurality of leads extending therefrom under vibrational stress conditions, which comprises:

a mounting block formed of insulating material and having a plurality of bores formed therein, metallic textile material positioned in each of the bores, wherein electrical devices may be mounted on the mounting block by inserting the leads thereof in the textile material, the body portions of the electrical devices being flush with the mounting block after the insertion thereof, a metallic collar having a hole therethrough to receive the lead of the electrical device in a snug fit, said metallic collar being mounted at the entrance portion of each bore to maintain the textile material in the bores during the vibratory stress applied to the apparatus, an electrical conductor connected to the textile material in each of the bores and extending therefrom externally of the apparatus for connection in a test circuit, vibratory means connected to the mounting block for applying vibratory forces of at least fifteen gravities to the mounting block, cover means readily attachable to the mounting block for securing electrical devices mounted thereon during the application of vibrational stress thereto, the cover means having recesses therein which are shaped to accommodate in a snug fit the body portions of devices inserted into the mounting block so as to securely maintain the devices on the mounting block under the vibrational stress, and an electrical test set connected to the electrical conductors to test the electrical devices mounted on the block during the vibration thereof.

References Cited by the Examiner

UNITED STATES PATENTS

| | | |
|---|---|---|
| 2,505,840 | 5/1950 | Shonnard. |
| 2,740,099 | 3/1956 | Schultz _____ 339—118 |
| 2,974,275 | 3/1961 | Haviland _____ 324—20 |
| 3,143,702 | 8/1964 | Kohler _____ 324—73 |
| 3,182,277 | 5/1965 | Ashby _____ 339—118 X |

FOREIGN PATENTS 1,013,919   8/1952   France.

OTHER REFERENCES

Semiconductor Products (Johnson et al.), February 1960, vol. 3, No. 2, pp. 43–46.

WALTER L. CARLSON, *Primary Examiner.*

E. L. STOLARUN, *Assistant Examiner.*